United States Patent
Thiessen et al.

(10) Patent No.: US 6,292,330 B1
(45) Date of Patent: Sep. 18, 2001

(54) MAGNETIC HEAD CLEANING CARTRIDGE WITH DISPLACEABLE HEAD RECEIVER

(75) Inventors: Jeffrey S. Thiessen, Champlin; John M. Enga, Rogers, both of MN (US)

(73) Assignee: Geneva Group of Companies, Inc., Minneapolis, MN (US)

(*) Notice: Subject to any disclaimer, the term of this patent is extended or adjusted under 35 U.S.C. 154(b) by 0 days.

(21) Appl. No.: 09/408,602

(22) Filed: Sep. 30, 1999

Related U.S. Application Data

(63) Continuation-in-part of application No. 09/136,179, filed on Aug. 19, 1998, now Pat. No. 6,097,572, which is a continuation-in-part of application No. 09/015,869, filed on Jan. 29, 1998, now Pat. No. 6,038,111.

(51) Int. Cl.$^7$ ........................................................ G11B 5/41
(52) U.S. Cl. .............................................................. 360/128
(58) Field of Search .............................. 360/128; 369/71; 15/DIG. 12, DIG. 13, DIG. 14

(56) References Cited

U.S. PATENT DOCUMENTS

| | | |
|---|---|---|
| 3,647,990 | 3/1972 | Eul, Jr. et al. . |
| 3,861,619 | 1/1975 | Wolff . |
| 4,388,663 | 6/1983 | Becella . |
| 4,408,243 | 10/1983 | Bonner et al. . |
| 4,470,089 | 9/1984 | Hutchins et al. . |
| 4,573,091 | 2/1986 | Barton, Jr. et al. . |
| 4,616,283 | 10/1986 | Clausen et al. . |
| 4,692,830 | 9/1987 | Willburger . |
| 4,698,712 | 10/1987 | Fritsch . |
| 4,761,700 | * 8/1988 | Fritsch ................................. 360/128 |
| 4,811,149 | 3/1989 | Clausen . |
| 4,941,065 | 7/1990 | Fritsch . |
| 5,012,376 | 4/1991 | Joannou et al. . |
| 5,021,911 | 6/1991 | Kingsbury . |
| 5,113,301 | 5/1992 | Huang . |
| 5,461,529 | 10/1995 | Clausen . |
| 5,541,794 | 7/1996 | Griffen et al. . |
| 5,742,461 | 4/1998 | Benson et al. . |
| 6,028,751 | * 2/2000 | Fritsch et al. ......................... 360/128 |
| 6,038,111 | * 3/2000 | Thiessen et al. ...................... 360/128 |
| 6,067,212 | * 5/2000 | Poorman .............................. 360/128 |
| 6,097,572 | * 8/2000 | Thiessen et al. ...................... 360/128 |
| 6,101,069 | * 8/2000 | Bryant et al. ......................... 360/128 |
| 6,154,341 | * 11/2000 | Dallago ................................ 360/128 |
| 6,166,881 | * 12/2000 | Anderson et al. .................... 360/128 |
| 6,215,618 | * 4/2001 | Anderson et al. .................... 360/128 |

FOREIGN PATENT DOCUMENTS 61-120320   6/1986   (JP) .

\* cited by examiner

*Primary Examiner*—Brian E. Miller
(74) *Attorney, Agent, or Firm*—Moore & Hansen

(57) ABSTRACT

A cleaning cartridge for cleaning a reciprocating read/write head of a tape drive. The cartridge includes a cleaning tape and cleaning segments that cooperate to clean the tape contacting surface and the air-bleed slots of a read/write head as it moves thereagainst. The cleaning segments are preferably mounted on a carrier that may be displaced to accommodate different models of tape drives having various read/write head projection depths, and which may include a resilient member for urging the cleaning segments towards the read/write head with a predetermined amount of force.

21 Claims, 4 Drawing Sheets

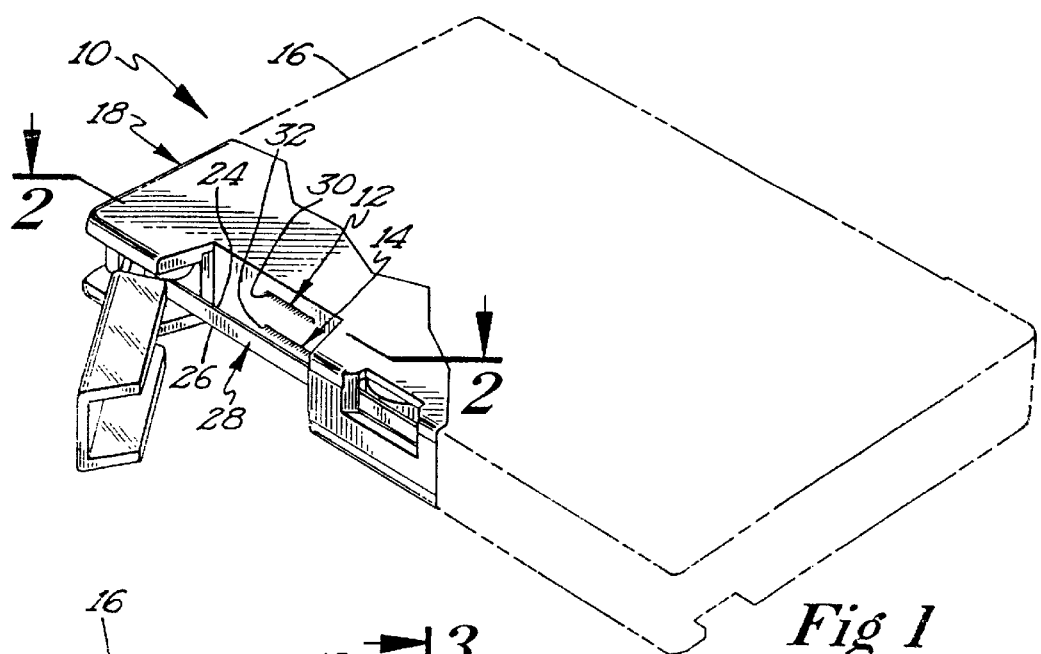
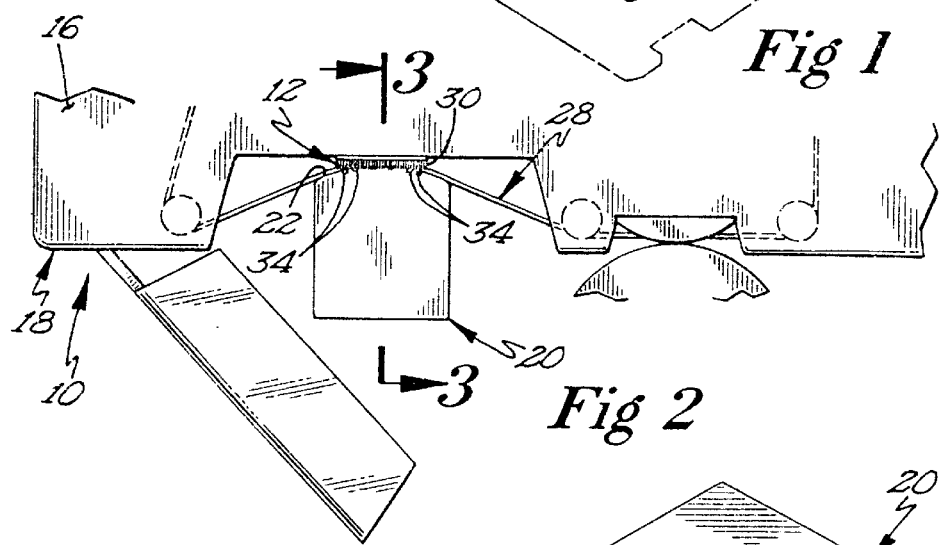
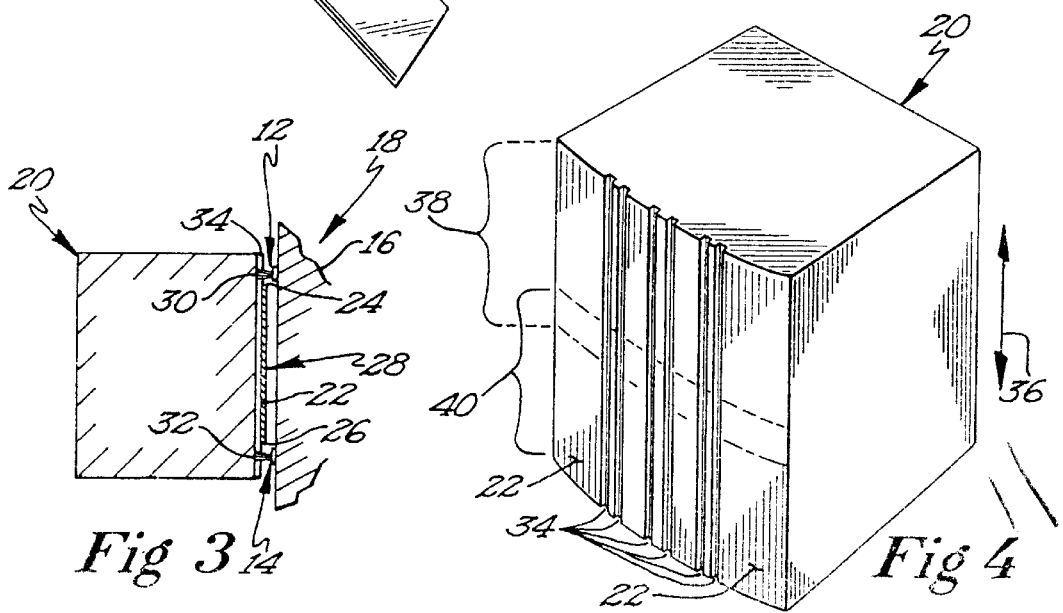
Fig 1
Fig 2
Fig 3
Fig 4

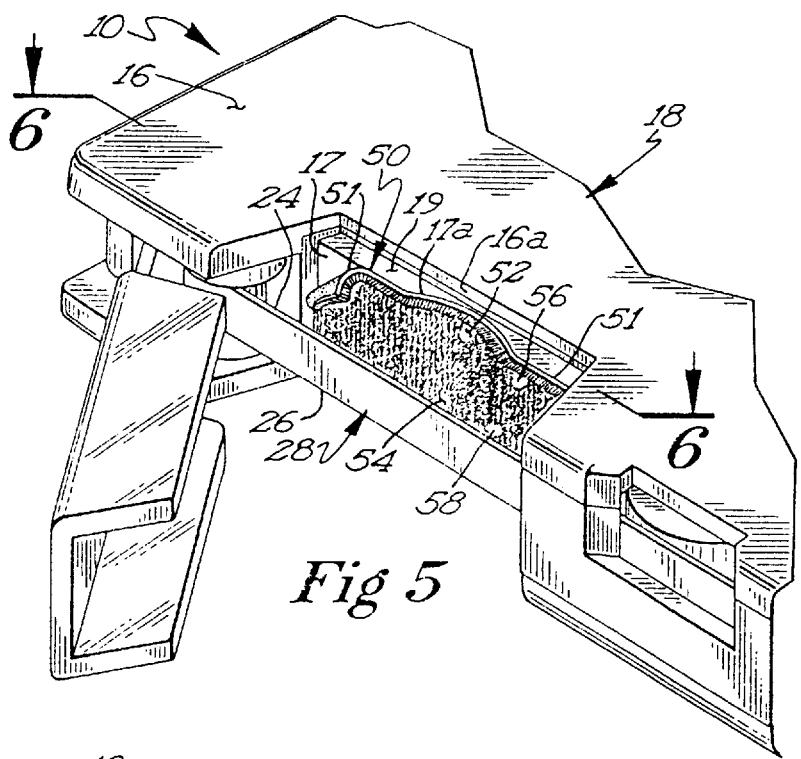
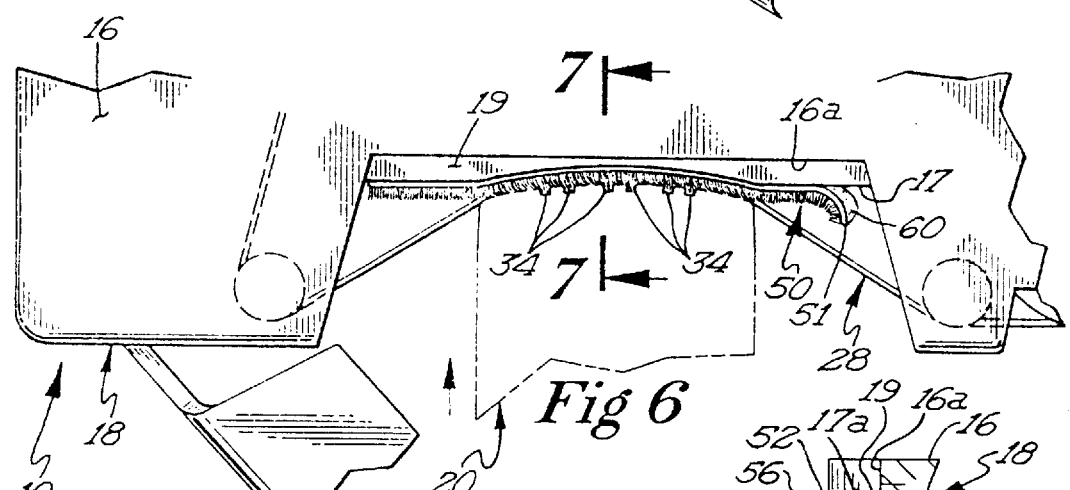
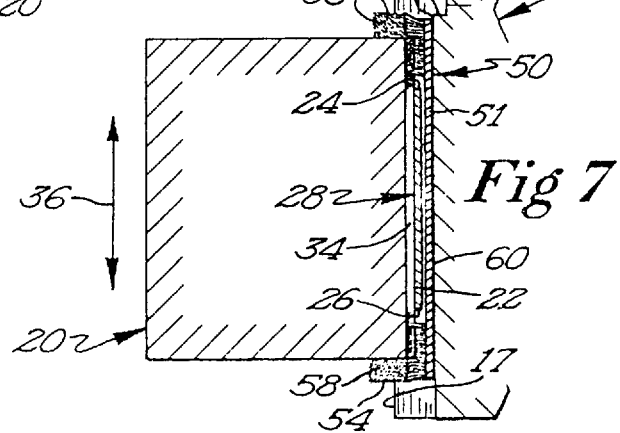

MAGNETIC HEAD CLEANING CARTRIDGE WITH DISPLACEABLE HEAD RECEIVER

RELATED APPLICATION

This application is a continuation-in-part of application Ser. No. 09/136,179, filed Aug. 19, 1998 now U.S. Pat. No. 6,097,572 issued Aug. 1, 2000 which is cip of Ser. No. 09/015,869 filed on Jan. 29, 1998 now U.S. Pat. No. 6,038,111.

BACKGROUND OF THE INVENTION

The present invention relates generally to an improved cleaning cartridge for cleaning the read/write head of a computer data backup drive, and more specifically to cleaning the air bleed slots in a read/write head.

The subject matter of U.S. Pat. No. 5,541,794 contains a detailed disclosure of a cleaning cartridge of the type discussed herein, and is hereby incorporated by reference. Typical tape backup drive systems employ a magnetic media recording tape, the read/write head of the tape drive, and firmware within the tape drive for initiating proper operation of the drive for backup and for cleaning purposes. Magnetic media used in computer data backup tapes have traditionally been constructed of an elongated tape coated with ferric oxide. Recently, backup tapes using a media coating of metal particles have become common. All magnetic media containing coatings have a tendency to generate debris during usage. Magnetic media having metal particle coatings typically shed more debris than ferric oxide magnetic media coatings.

Traditionally, tape drive read/write heads have had contours on the media-contacting portion of the head consisting of smooth bumps with ramps. Recently, many tape drive read/write heads have begun to use heads with media-contacting portions of the head having bumps with sharp edges. These new read/write heads also contain a plurality of substantially vertical slots, known as air bleed slots, which assist in the provision of good read/write head to media tape contact.

Typical magnetic media tape speeds across a read/write head range from 90 to 120 inches per second. When the media tape is moving with such high speed across a read/write head, air may become trapped between the tape and the read/write head, creating an air bearing which adversely affects the quality of contact between the tape and the read/write head. The substantially vertical air bleed slots of a new type read/write head are aligned substantially perpendicular to the direction of motion of the media tape past the read/write head. The sharp edges of the air bleed slots effectively cut the air build up between the read/write head and the tape. The air bleed slots serve to allow this cut air to be dissipated from between the read/write head and the media tape through the slots, allowing a more consistent head to tape contact.

It is well known that a build up of debris within a tape drive can lead to decreased performance and even damage the tape drive. Some of the debris shed by the magnetic media accumulates in the air bleed slots. When these slots become partially or fully filled with debris, they are no longer effective in allowing cut air to bleed away from the interface between the magnetic tape and the read/write head. When this happens, the quality of contact between the tape head and magnetic media is compromised. Traditional cleaning tapes move across the read/write head of a tape drive in a direction substantially perpendicular to the vertical slots. During a cleaning operation, firmware for the drive causes the read/write head to reciprocate vertically up and down. However, even this vertical reciprocation does not allow effective cleaning of the air bleed slots by the cleaning tape because the cleaning tape does not penetrate into the slots. Accordingly, a conventional cleaning tape is inefficient to fully clean the read/write head of a tape drive when the read/write head contains air bleed slots.

One problem that cleaning cartridges have largely failed to overcome is being able to accommodate different models of magnetic media recorders/players. Though the size of the read/write heads are relatively standard, small differences are often experienced in the distance the heads travel when engaging a cassette cartridge. For purposes of simply playing or recording a tape, these small differences are largely inconsequential. However, cleaning cartridges, such as the one described herein, can also employ brushes or cleaning elements in addition to a spool of cleaning tape. In order to make contact with the read/write head, a stationary cleaning element must be located the proper distance from the head such that, when the head completes its engaging travel, the head comes in contact with the elements enough to effect cleaning of the head, but not so much that the tape passing between the head and the cleaning elements experiences excessive friction.

It would therefore be desirable to provide a cleaning cartridge capable of not only cleaning the surface of the read/write head of a tape drive, but also its air bleed slots.

It would also be desirable to provide an apparatus to clean the air bleed slots of a read/write head, wherein the apparatus may be used with existing tape drive cleaning cartridges.

It would also be desirable to provide an apparatus for cleaning the surface and air bleed slots of a read/write head which is capable of tolerating minor differences in the read/write head travel distances of various tape drives.

SUMMARY OF THE INVENTION

The present invention overcomes the problems of the prior art by providing an improved cleaning cartridge which not only cleans the read/write head of a tape drive, but also loosens and cleans debris from the air bleed slots of the read/write head. The present invention comprises, in combination with a cleaning cartridge of the type disclosed in U.S. Pat. No. 5,541,794, a stationary cleaning device comprising at least two stationary cleaning elements or segments positioned so as to engage the slots of the read/write head during a cleaning operation and to clean debris from the slots.

The cleaning device is attached near the front of the cleaning cartridge housing where the cartridge receives the read/write head and is positioned so that the read/write head of the tape drive contacts the vertically stationary cleaning elements or segments during a cleaning operation. In addition to the cleaning device, the cartridge also carries a supply of cleaning tape wound around a spool rotatably attached to the housing for movement along a tape path extending along the front side of the housing. The tape is positioned to engage the read/write head during cleaning use.

In one embodiment, the cleaning device may comprise two, separate, vertically spaced cleaning elements, one above the cleaning tape and the other below it.

In a preferred embodiment, the cleaning device comprises a single, elongated band or pad having upper and lower cleaning segments extending above and below the cleaning tape.

As a further beneficial feature, the cleaning device further comprises a mounting carrier moveably attached to the cleaning cartridge housing in such a way that it is reciprocally moveable along a linear or arcuate path. The cleaning elements are mounted on the carrier. Preferably, the carrier is forwardly biased and resiliently rearwardly displaceable in order to ensure relatively constant, positive contact of the cleaning elements with the read/write head of a tape drive, despite the variations in head size and head projection depth found among different models of tape drives.

It is preferred that the moveable carrier also be reversible, thereby having two orientations, such that it may provide a dual function. In the first orientation, the carrier is stationary. A second orientation is achieved by removing the carrier from the cartridge, turning it around one half revolution, and replacing it. When the carrier is placed in the second orientation, the carrier is forwardly biased and resiliently displaceable.

Each of the two mounting surfaces of the reversible carrier may have a cleaning element. The mounting surface utilized when the carrier is placed in the second orientation preferably has an indentation which is approximately the same width as the cleaning tape. This allows more positive contact between those portions of the cleaning element which are above and below the cleaning tape, and the vertically reciprocating read/write head of a tape drive.

The vertically stationary cleaning elements and segments are designed so that some portion of each cleaning element and segment extends into a position to come in contact with the substantially vertical air bleed slots in a manner which allows the vertically stationary cleaning device to loosen and or remove debris from the air bleed slots. To accomplish this, the cleaning elements and segments are designed and positioned so that each has associated filaments, fibers or strands of material which extend substantially perpendicular to the tape contact face of the read/write head of the tape drive during a cleaning operation.

The cleaning device is positioned substantially parallel to the direction of tape movement, and so that each cleaning element or segment provides the cleaning capability for a different section of the read/write head of the computer tape drive.

The cleaning elements or segments come in contact with the read/write head in such a position to provide effective cleaning of the entire length of the air bleed slots. As the read/write head reciprocates substantially vertically during a cleaning operation, the vertically stationary cleaning elements or segments are swept over a substantially larger section of the head than they would contact if the read/write head did not vertically reciprocate. The reciprocation of the read/write head allows full cleaning coverage of the entire read/write head of a computer tape drive by the vertically stationary cleaning elements or segments.

In order to effect the full coverage of the read/write head of the computer data backup drive by the vertically stationary cleaning device, it is necessary to properly position the cleaning device so that the sections of the read/write head for which the cleaning elements or segments clean the substantially vertical air bleed slots overlap slightly. Knowing the displacement vertically of the read/write head during a cleaning operation allows the effective positioning of the vertically spaced cleaning elements or segments so that the first or upper cleaning element or segment provides cleaning coverage for at least half of the read/write head of the computer data backup drive, and the second or lower cleaning element or segment provides cleaning coverage for at least the other half of the read/write head. Additional cleaning elements and segments could be added in order to further increase the cleaning effectiveness of the present invention. Where a single band or pad cleaning device is used, the band or pad must be wide enough in a vertical direction to define upper and lower cleaning segments extending above and below the cleaning tape.

A variety of materials will provide physical characteristics sufficient to effectively loosen and remove debris from within the air bleed slots without damaging the read/write head. Examples of materials suitable for use as a stationary cleaning device include a single row of nylon threads containing multiple filaments, multiple rows of nylon threads containing multiple filaments, foam, natural brush fibers, sponge, polyester, and the like. An important consideration for determining the material to be used for the vertically stationary cleaning device is that it provides sufficient stiffness and penetration to be able to effectively loosen and clean debris from the substantially vertical air bleed slots of the read/write head of the computer data backup drive. At the same time, the material must be soft enough to avoid scratching or otherwise damaging the head of the tape drive. Specific cleaning objectives could be met using varying diameter and number of filaments per thread and other material characteristics. For the embodiment utilizing a single, continuous band or pad of cleaning material a brush pad comprised of a plurality of fibers projecting substantially perpendicular to the cleaning tape is effective.

During a cleaning operation, the read/write head of the tape drive comes in contact with and displaces the cleaning tape of the cleaning cartridge such as the cartridge described in the incorporated reference. In doing so, the read/write head travels over a predetermined range of linear motion ranging from a rest position to an operating position. Effective positioning of the cleaning elements or segments at a location on the cleaning cartridge housing inwardly and rearwardly from the normal cleaning tape path will allow the vertically stationary cleaning elements or segments to contact the read/write head when the head is in its optimal cleaning position in which the cleaning tape is displaced somewhat from its non-use position. It is sufficient that the filaments, fibers or strands of the cleaning elements and segments are positioned to enable them to penetrate the air bleed slots and to loosen and clean any accumulated debris therefrom. Preferably, the cleaning device is mounted such that it is has at least one orientation which is resiliently displaceable by a predetermined amount in a direction substantially perpendicular to the direction of tape travel, and substantially parallel to the direction which the read/write head of the tape drive moves while it engages and disengages a cassette cartridge. The device, in this orientation, is forwardly biased such that it presses lightly against the read/write head.

In the embodiment wherein the cleaning device further comprises a mounting carrier moveably attached to the cleaning cartridge housing, it is further preferred that the cleaning device is slidably attached to the housing for movement in a direction coextensive with the direction of motion of the read/write head of the tape drive, and positioned such that contact is made with the read/write head prior to the head's complete engagement with the cleaning cartridge. This effects a rearward displacement of the cleaning device by the read/write head, thereby ensuring a relatively constant and predictable pressure exerted on the head by the forwardly biased cleaning device. Such a predictable exertion pressure results in the desired cleaning performance regardless of the brand of tape drive the cartridge is used to clean.

It is envisioned that the device is forwardly biased by a spring operably attached to the housing and positioned such that the spring exerts a force on a surface of the device, thereby urging the device toward the read/write head.

Alternately, the cleaning device may be pivotally attached to the housing such that the mounting surface of the cleaning device has a predetermined arcuate path of motion positioned such that the predetermined linear travel of motion of the read/write head of the tape drive is substantially tangential to the predetermined arcuate path of motion of the mounting surface.

The cleaning device could be any suitable shape, so long as an appropriate mounting surface is provided. A recommended shape might be that of an "I" wherein the cleaning device has a rear surface spaced from a forward wall with a mounting surface and attached thereto by at least one connecting member. This shape provides both longitudinal and lateral stability to the cleaning device.

In order to define a predetermined linear range of motion of the cleaning device, it is envisioned that its movement be limited by at least one projection integral with the housing. This projection is positioned in such a way as to stop the motion of the device in at least one direction.

The embodiment wherein the cleaning device comprises a moveable carrier may incorporate two opposing connecting members or side walls integral with the forward wall and extending rearwardly therefrom to define a slot between the walls for receiving a forward guide post and a rearward guide post affixed to the housing such that the guideposts are received within the slot to guide the carrier along a linear path. The slot is forwardly defined by the forward wall thereby providing a rearward limit to the range of linear sliding motion of the carrier when the forward wall contacts the forward guidepost. A rear wall integral with the side walls rearwardly defines the slot and thereby provides a forward limit to the range of linear sliding motion of the carrier when the rear wall contacts the rearward guidepost.

It is envisioned that the mounting surface of the cleaning device on which the cleaning device elements or segments are mounted may be of differing shapes to maximize effectiveness. For example, the mounting surface may be concave to receive a convex read/write head in conforming relation thereto. Alternatively, the mounting surface could be convex or flat and permit the cleaning elements or segments to engage a convex read/write head so as to ensure positive contact therewith.

These and other benefits of the present invention will become apparent from the following detailed description thereof taken in conjunction with the accompanying drawings, wherein like reference numerals designate like elements throughout the several views. It should be understood throughout this specification that the orientation terms such as horizontal and vertical are used in their most relative sense and are not to be construed to place any limitations on the use of the disclosed devices in geometric relation to the Earth or forces of gravity. These terms are merely used for convenience in describing relative perpendicular relationships to other parts of the same devices herein described. It is to be understood by those skilled in the art and otherwise that the device could be used in any actual orientation.

BRIEF DESCRIPTION OF THE DRAWINGS

FIG. 1 is a perspective view of the stationary cleaning elements of the present invention in combination with a cleaning tape and cleaning cartridge;

FIG. 2 is a top view of the cleaning cartridge of FIG. 1 taken along lines 2—2 thereof, and showing the stationary cleaning elements and cleaning tape during a cleaning operation;

FIG. 3 is a section view taken along lines 3—3 of FIG. 2 showing the cleaning tape and stationary cleaning elements during a cleaning operation;

FIG. 4 is a perspective view of a typical read/write head of a computer data backup drive;

FIG. 5 is a perspective view of an alternative version of cleaning device in combination with a cleaning tape and cleaning cartridge;

FIG. 6 is a top view taken along lines 6—6 of FIG. 5 and showing the cleaning device and cleaning tape during a cleaning operation;

FIG. 7 is a vertical section view taken along lines 7—7 of FIG. 6;

DESCRIPTION OF THE PREFERRED EMBODIMENTS

Figure 8:
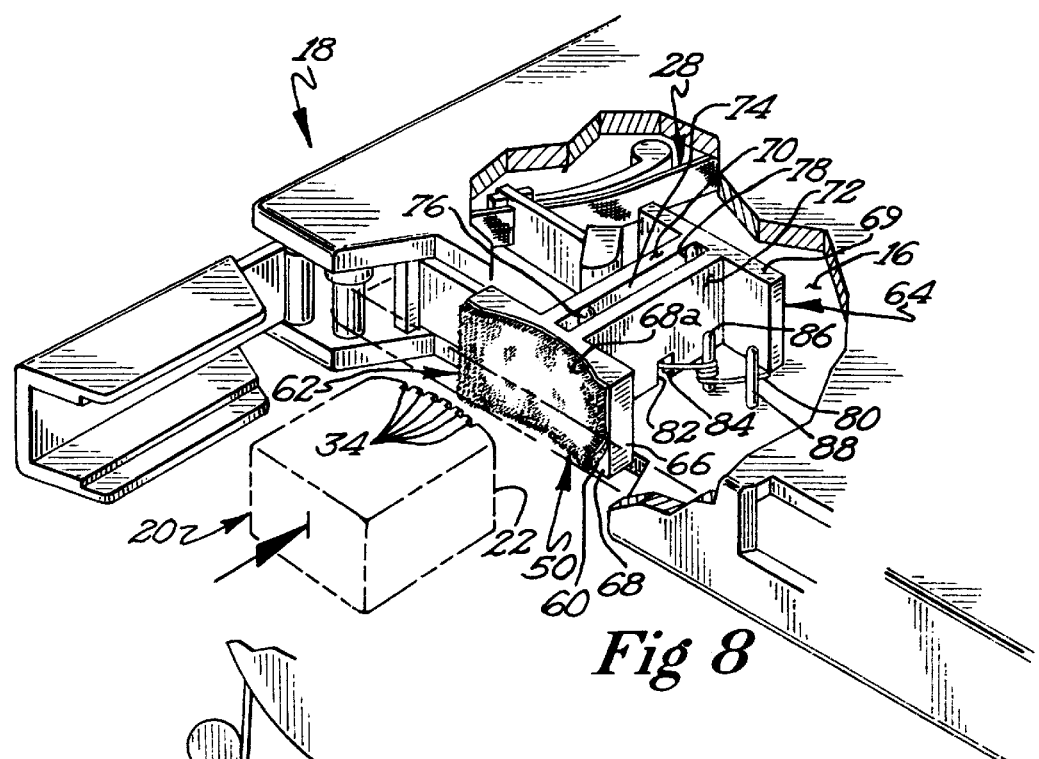
FIG. 8 is a perspective view of an alternative version of cleaning device in combination with a cleaning tape and cleaning cartridge wherein the cleaning device is resiliently displaceable.

Referring now to the drawings, and especially to FIG. 1, the cleaning device 10 is shown in detail. Cleaning device 10 comprises a pair of vertically stationary cleaning elements 12 and 14 attached to the housing 16 of a cleaning cartridge 18. Vertically stationary cleaning elements 12 and 14 are positioned so that when cleaning cartridge 18 is placed in a tape drive for cleaning the read/write head 20 of the tape drive, the vertically stationary cleaning elements 12 and 14 contact the read/write head 20 on its tape contact surface 22. Surface 22 is the surface of the read/write head 20 which contacts the magnetic media tape of a typical computer data backup tape. Cleaning elements 12 and 14 may be seen to be positioned near opposite edges 24 and 26 of cleaning tape 28, respectively. The position of vertically stationary cleaning element 12, near edge 24 of cleaning tape 28, may also be described as being above cleaning tape 28. The position of vertically stationary cleaning element 14, near edge 26 of cleaning tape 28, may also be described as being below cleaning tape 28. This is best seen in FIG. 3. The vertically stationary cleaning elements 12 and 14 are positioned so that both the cleaning tape 28 and the vertically stationary cleaning elements 12 and 14 may contact the read/write head 20 at the same time.

Depending upon the size and position of the cleaning tape 28, additional vertically stationary cleaning elements may be utilized to increase the cleaning effectiveness of the invention 10. The positioning of such additional cleaning elements could be above and below leaning elements 12 and 14.

Vertically stationary cleaning elements 12 and 14 are attached to the housing 16 of cartridge 18 by any suitable attachment method, including gluing, molding, and the like. As shown in FIG. 1, cleaning elements 12 and 14 are preferably positioned substantially parallel to the direction of motion of cleaning or media tape. The filaments or strands 30 preferably extend substantially perpendicular to the face 22 of read/write head 20, although all that is required is that the filaments or strands 30 are positioned so that they can penetrate slots 34 for cleaning. Suitable attachment of the vertically stationary cleaning elements 12 and 14 to the housing 16 of cartridge 18 requires the cleaning elements 12 and 14 to have their bristles or strands 30 and 32, respectively, extending so that the bristles or strands 30 and 32 can penetrate air bleed slots 34, which extend substantially vertically along tape contact surface 22 of read/write head 20. Slots 34 are typically from eight to twelve thousandths of an inch wide, and three to six thousandths of an inch deep. The air bleed slots 34 are substantially perpendicular to the normal travel direction of a cleaning tape such as cleaning tape 28 or a magnetic media tape used in the tape drive.

During a cleaning operation, read/write head 20 displaces cleaning tape 28 to the position shown in FIG. 2, wherein the cleaning tape 28 and that vertically stationary cleaning elements 12 and 14 are each in direct contact with tape contact surface 22 of read/write head 20. In this position, the filaments or strands 30 and 32 of vertically stationary cleaning elements 12 and 14 respectively, extend into slots 34 of read/write head 20. During a cleaning operation, firmware within the tape drive causes read/write head 20 to reciprocate in the direction shown by arrow 36. The up and down motion of read/write head 20 while the filaments or strands 30 and 32 of vertically stationary cleaning elements 12 and 14 extend into the slots 34 of read/write head 20 allows the filaments 30 and 32 of vertically stationary cleaning elements 12 and 14 to loosen and remove accumulated debris from slots 34 along their entire vertical length.

The positioning of vertically stationary cleaning elements 12 and 14 is such that the reciprocation of read/write head 20 allows the vertically stationary cleaning elements 12 and 14 to loosen and remove debris from the entire vertical length of the slots 34. Read/write head 20 and slots 34 have an upper portion 38 comprising at least the top half of the read/write head 20, tape contact surface 22, and slots 34 (FIG. 4). Read/write head 20 and slots 34 also have a lower portion 40 comprising at least the bottom half of the read/write head 20, tape contact surface 22, and slots 34 (FIG. 4). Upper section 38 and lower section 40 preferably overlap to allow full cleaning coverage of slots 34 by vertically stationary cleaning elements 12 and 14. While this overlapping of the upper section 38 and the lower section 40 is preferable, in order to ensure full cleaning of slots 34 by cleaning elements 12 and 14, sections 38 and 40 need not overlap if the reciprocating motion of read/write head 20 allows the sections 38 and 40 to comprise the full length of the slots 34. Further overlapping sections would be created by use of additional vertically stationary cleaning elements.

The vertically stationary cleaning elements 12 and 14 may be comprised of a variety of materials, provided that the material chosen for vertically stationary cleaning elements 12 and 14 is sufficiently stiff to loosen and remove debris from slots 34 yet flexible enough to effectively penetrate slots 34. The vertically stationary cleaning elements 12 and 14 may comprise a single row of nylon threads containing multiple filaments. These nylon threads may be part of a deconstructed section of woven nylon, or may be individual nylon threads having multiple filaments. Multiple rows of nylon threads containing multiple filaments could also be used. Other materials which are capable of penetrating slots 34 while still providing sufficient stiffness to loosen and remove debris from slots 34 include foam, natural fibers, sponge, polyester, and the like. Differing read/write heads 20 may have different size slots 34. In the embodiment wherein vertically stationary cleaning elements 12 and 14 comprise a single row of nylon threads forming filaments or strands 30 and 32, the thread diameter and/or number of filaments of each thread may be modified to achieve specific cleaning objectives.

FIGS. 5–7 show an alternative embodiment of a preferred cleaning device. Device 50 is a pad comprised of a plurality of filaments projecting substantially perpendicularly to the plane of the pad and of a mounting surface 17. Preferably, device 50 is a pad of flock material comprised of a plurality of nylon filaments on the order of 0.055" in length impregnated into a backing which is preferably paper 51 as shown in FIG. 6.

Device 50 has a vertical dimension as attached for use against surface 17 so as to provide upper and lower cleaning segments 52 and 54, respectively, which extend above and below the top and bottom edges 24 and 26 of cleaning tape 28. Cleaning element pad 50 may be attached to mounting surface 17 in a variety of ways such as by an adhesive, preferably a double-sided adhesive strip 60, or a molding process.

Cleaning element pad 50 is flexible and will conform to the shape of mounting surface 17. It is envisioned that mounting surface 17 may be flat, concave or convex in a vertical plane. For that purpose, surface 17 may be formed as an integrally molded projection 19 from recessed front face 16a of housing 16. Mounting surface 17 may also have a portion 17a which may be concave or convex. Preferably, as most clearly appears in FIG. 6, surface 17 has a concave portion 17a which is so radiused as to provide a concave shape to receive the convex face 22 of read/write head 20 in conforming relationship therewith. This provides positive contact between fibers 56 and 58 and slots 34 when head 20 is pushed in fully against tape 28 as shown in FIGS. 6 and 7.

Vertically stationary cleaning segments 52 and 54 are positioned in a substantially vertical plane displaced rearwardly from the vertical plane in which the cleaning tape is normally disposed. However, when cleaning cartridge 18 is placed in a tape drive for cleaning the read/write head 20 of the tape drive, the vertically stationary cleaning segments 52 and 54 contact the read/write head 20 on its tape contact surface 22. As shown in FIGS. 2 and 5, surface 22 is the surface of the read/write head 20 which contacts the magnetic media tape of a typical computer data backup tape. Cleaning segments 52 and 54 are positioned to extend above and below top and bottom edges 24 and 26 of cleaning tape 28, respectively. This is best seen in FIG. 7. The vertically stationary cleaning segments 52 and 54 are located so that both the cleaning tape 28 and the vertically stationary cleaning segments 52 and 54 will contact the read/write head 20 at the same time during a cleaning operation.

Figure 9:
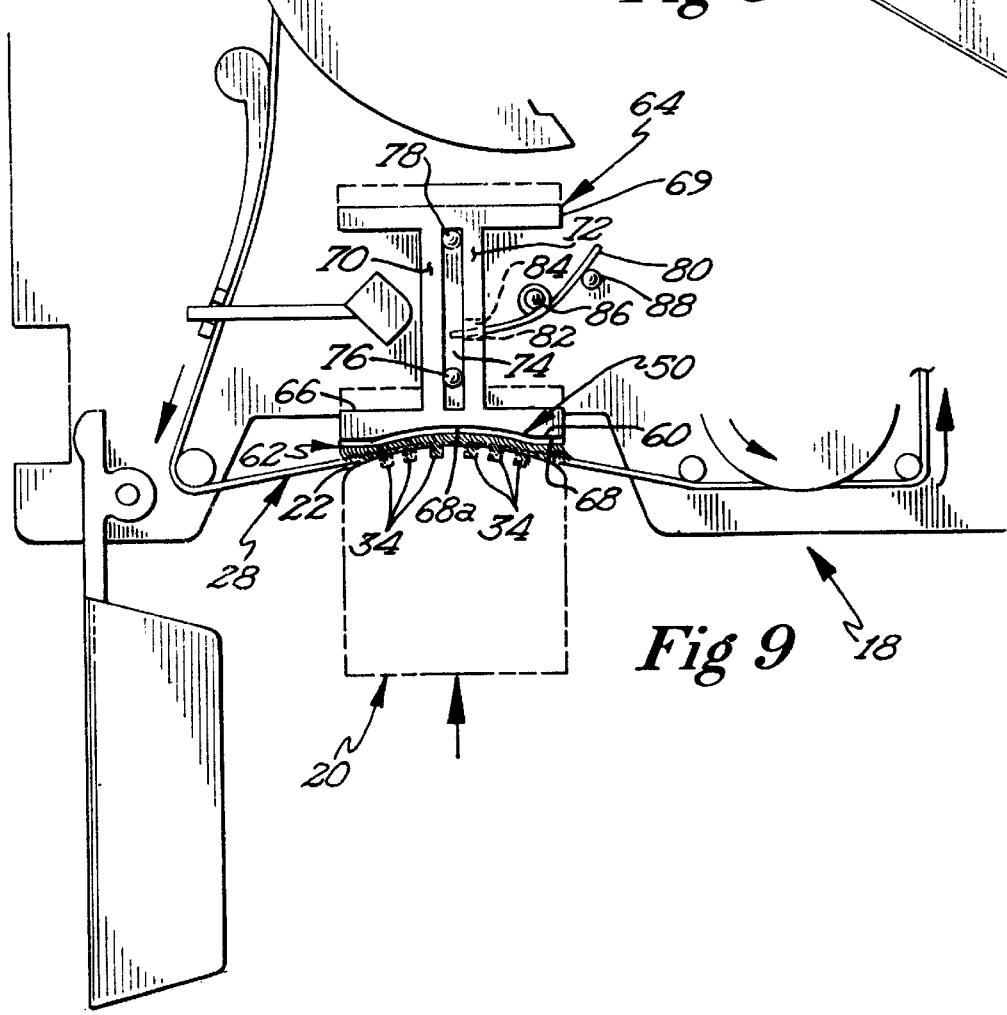
FIG. 9 is a top plan view of the embodiment shown in FIG. 8.

FIGS. 8–9 show a cleaning device 62. Device 62 comprises the cleaning element pad 50 described above and depicted in FIGS. 5–7, similarly mounted via double-sided adhesive strip 60 to a carrier 64.

Carrier 64 has a forward wall 66 which provides mounting surface 68 for the mounting of pad 50 thereon. Similar to stationary mounting surface 17 described above and depicted in FIGS. 1–6, mounting surface 68 may be flat, concave or convex in a vertical plane. Preferably, surface 68 has a concave portion 68a which is so radiused as to provide a concave shape to receive the convex face 22 of read/write head 20 in conforming relationship therewith.

Carrier 64 is resiliently displaceable and forwardly biased. Carrier 64 can take on any shape to effect a moveable mounting arrangement into housing 16. FIGS. 8–9 show a carrier 64 having a forward wall 66 joined to rear wall 69 by at least one connecting member or side wall, preferably two opposing side walls 70 and 72.

It is envisioned that the range and direction of the movement of carrier 64 be defined, at least in part, by projections or posts affixed to or integral with housing 16. These projects could interact with any surface of carrier 64. The preferred embodiment shown in FIGS. 8–9 depict side walls 70 and 72 spaced laterally to form a slot 74 therebetween. Slot 74 receives a forward guide post 76 and a rear guide post 78 affixed to housing 16. Posts 76 and 78 guide carrier 64 along a linear path. Movement in the forward direction is limited by the location of the rear guide post 78 in that the carrier 64 may travel forward until rear wall 69 contacts post 78. Similarly, movement in the rearward direction is limited by the location of the forward guide post 76. Carrier 64 may travel rearwardly, as it would when pressed upon by a read/write head 20, until forward wall 66 contacts forward guide post 76.

Though not shown in the Figures, many combinations of carrier shapes and projection shapes and locations are possible to achieve the same or similar carrier movement. For example, a single elongate post could replace forward and rear posts 76 and 78. Alternatively, side walls 70 and 72 could be replaced by a single side wall surrounded by posts or projections on either side.

An alternative to a linear, sliding motion of carrier 64 is also envisioned but not shown in the Figures. In this embodiment, a front wall providing a mounting surface is attached opposite the mounting surface to the proximate end of a radial arm. The distal end of the radial arm is pivotally attached to the housing of the cartridge. This would provide an arcuate path of movement for cleaning element pad 50. Preferably, the linear path of travel of read/write head 20 would be substantially tangential to the arcuate path of the pad 50, thereby minimizing the lateral displacement of the pad 50 against the head 20 as the pad 50 travels with the head 20.

Regardless of the path of travel, it is important that device 62 be forwardly biased such that pad 50 maintains relatively constant, positive contact with read/write head 20. Preferably, a spring 80 is provided and operable attached to housing 16. Spring 80 acts against surface 82 so as to exert a forwardly directed force upon the surface 82, thereby maintaining the device 62 in a forward position when device 62 is not acted rearwardly upon by read/write head 20. The location of surface 82 is unimportant so long as a forwardly directed force is achieved thereupon by spring 80. FIGS. 8–9 depicts side wall 72 as defining a recess 84 which receives an end of spring 80 and provides surface 82. Spring 80 is operably attached to spring mounting post 86 of housing 16 and acts against post 88 of housing 16.

Figure 11:
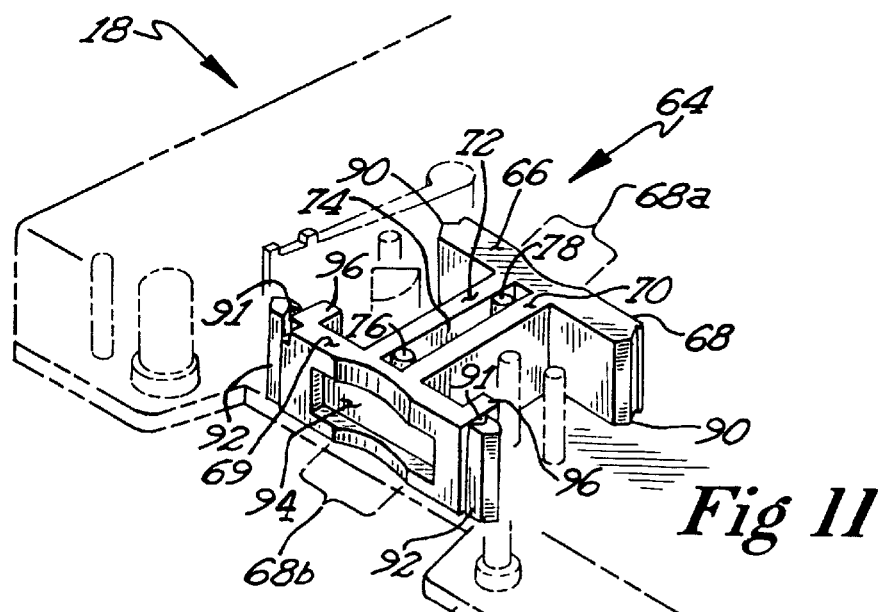
Figure 10:
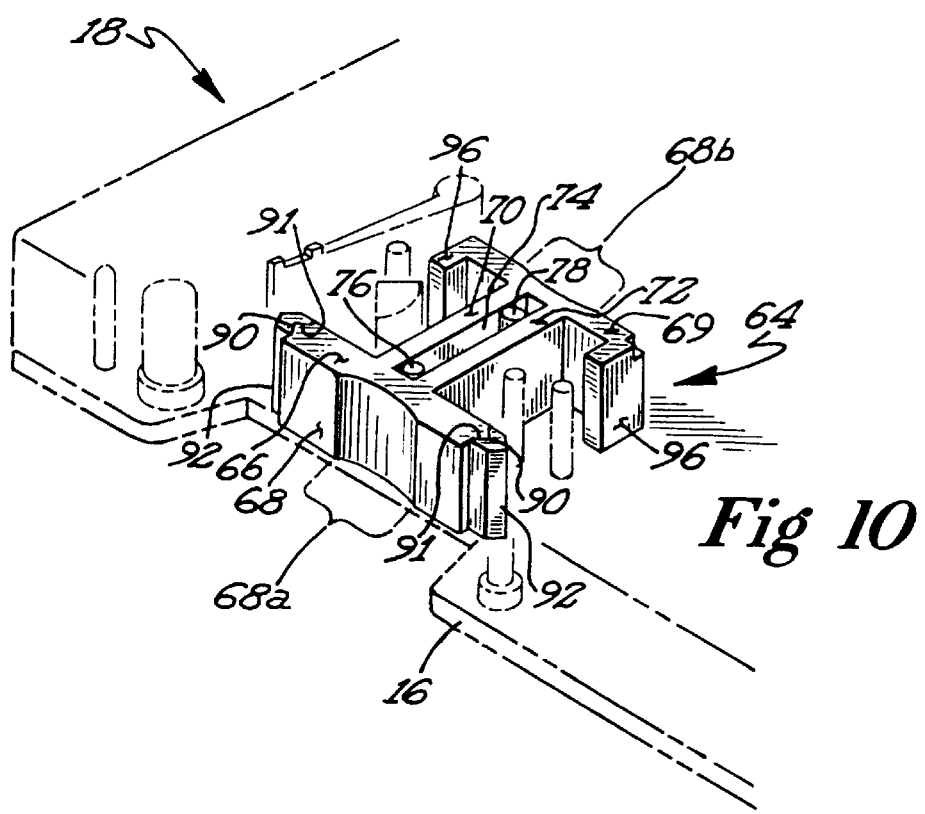
FIG. 10 is a partial, perspective view of an alternative embodiment wherein the cleaning device is mounted on a reversible carrier shown in a first, stationary orientation; and, FIG. 11 is a partial, perspective view of the carrier of FIG. 10 shown in a second, resiliently displaceable orientation.

A preferred embodiment of carrier 64 is depicted in FIGS. 10 and 11, wherein carrier 64 is removable and reversible so that it may attain a first orientation, that shown in FIG. 10, and a second orientation, shown in FIG. 11. Note that the cleaning element pads 50 that would normally be attached to support surfaces 68 at the forward and rear walls 66, 69, respectively, as well as the biasing spring 80 of the carrier 64 have been omitted to facilitate a better understanding of the invention. As seen in both FIGS. 10 and 11, carrier 64 has anchoring projections 90 extending outwardly from the extreme lateral edges of forward wall 66. When the carrier is in a first orientation, as in FIG. 10, anchoring projections 90 engage grooves 91 of anchoring posts 92, thereby laterally locking carrier 64 in place. In this orientation, carrier 64 effectively causes the embodiment of cartridge 18 shown in FIG. 10, to operate like the embodiment of cartridge 18 shown in FIGS. 5–7.

FIG. 11 shows the second orientation of this embodiment. Carrier 64 has been lifted from housing 16, rotated 180 degrees, and replaced so that rear wall 69 now faces forward. It can be seen that rear wall 69 has a shaped portion 68b, similar to portion 68a of mounting surface 68. Rear wall 69 also defines indentation 94. Wings 96 extend from the extreme lateral edges of rear wall 69 toward forward wall 66. Wings 96 abut against anchoring posts 92 such that while carrier 64 is being displaced, wings 96 slide against posts 92 thereby increasing the stability of carrier 64 and preventing rear wall 69 from becoming interfered with by posts 92 when carrier 64 is travelling rearwardly from a forward rest position.

In operation, the device 10 functions as follows. When a cleaning cartridge such as cleaning cartridge 18 is inserted into the tape drive of a computer data backup system, firmware within the tape drive recognizes a cleaning operation. The read/write head 20 of the tape drive comes into contact with and displaces the cleaning tape 28 of cleaning cartridge 18. At the same time, the displacement by the read/write head 20 of cleaning cartridge 18 brings the tape contact surface 22 of read/write head 20 into contact with upper and lower vertically stationary cleaning elements 12 and 14, and more specifically with the filaments or strands 30 and 32 of vertically stationary cleaning elements 12 and 14, respectively. The tape drive firmware initiates a reciprocating up and down motion of read/write head 20, as indicated by motion arrow 36, in order to allow the cleaning tape 28 to fully clean the entire tape contact surface 22 of read/write head 20.

At the same time, the positioning of read/write head 20 causes the filaments or strands 30 and 32 of vertically stationary cleaning elements 12 and 14 to penetrate into slots 34 of the read/write head 20. The reciprocating motion of read/write head 20 causes the filaments or strands 30 and 32 of cleaning elements 12 and 14 to loosen and remove debris along the length of slots 34, cleaning accumulated debris from the slots 34 to prevent the formation of an air bearing which would affect tape to read/write head 20 contact. The cleaning of the read/write head tape contact surface 22 and the slots 34 occurs simultaneously. This allows the cleaning tape 28 not only to clean the tape contact surface 22 of read/write head 20, but also to carry away debris loosened or removed from slots 34 of read/write head 20 by filaments or strands 30 or 32 of vertically stationary cleaning elements 12 and 14.

The operation of the embodiment of the cleaning device 50 shown in FIGS. 5–7 is substantially the same as the operation of the embodiment shown in FIGS. 1–4 as described above. A cleaning operation is recognized by firmware within the tape drive when a cleaning cartridge such as cleaning cartridge 18 is inserted into the tape drive of a computer data backup system. The read/write head 20 of the tape drive moves toward the cleaning cartridge 18 until the tape contact surface 22 comes into contact with upper and lower cleaning segments 52 and 54, and more specifically, with the filaments, fibers or strands 56 and 58 of cleaning segments 52 and 54, respectively. This movement of the read/write head 20 also causes the head 20 to push against the cleaning tape 28 of cleaning cartridge 18, displacing it rearwardly. The tape drive firmware initiates a reciprocating up and down motion of read/write head 20, as indicated by motion arrow 36, allowing the cleaning tape 28 to fully clean the entire tape contact surface 22 of read/write head 20, and further allowing the filaments, fibers or strands 56 and 58 to penetrate and clean the entire vertical lengths of slots 34, thereby preventing the formation of an air bearing.

The operation of the embodiment of the cleaning device 62 shown in FIGS. 8–11 is substantially the same as the operation of the embodiment shown in FIGS. 1–7 as described above except that horizontal movement is added to the device 62 which is coextensive with the movement of the read/write head 20. Again, a cleaning operation is recognized by firmware within the tape drive when a cleaning cartridge such as cleaning cartridge 18 is inserted into the tape drive of a computer data backup system. The read/write head 20 of the tape drive moves toward the cleaning cartridge 18. Tape contact surface 22 pushes against the cleaning tape 28 of cleaning cartridge 18, displacing it rearwardly. Surface 22 continues moving and comes into contact with upper and lower cleaning segments 52 and 54, and more specifically, with the filaments, fibers or strands 56 and 58 of cleaning segments 52 and 54, respectively. Depending on the travel length of the read/write head 20, the movement continues thereby applying a rearward force against device 62. Device 62 is displaced rearwardly, guided by the interaction between carrier slot 74 and posts 76 and 78. As device 62 is rearwardly displaced, surface 82 moves spring 80, thereby storing potential spring energy therein.

Once the cleaning operation is completed, the read/write head 20 withdraws from cartridge 18. As head 20 withdraws, spring 80 acts against surface 82 and post 88, releasing the stored spring energy, and moving device 62 forward until rear wall 69 contacts stationary rear guide post 78.

If the carrier 64 shown in FIGS. 10–11 is used to carry device 62, and carrier 64 is arranged to assume the first orientation shown in FIG. 10, then a rearward force applied to device 62 will not cause carrier 64 to be displaced rearwardly due to the interaction between anchoring projections 90 and the grooves 91 of anchoring posts 92.

However, if carrier 64 is arranged to assume the second orientation, shown in FIG. 11, the operation will be the same as that described above, with wings 96 sliding against anchoring posts 92 to assist in the rearward and forward guidance of carrier 64. However, because carrier 64 has been reversed, as head 20 withdraws causing spring 80 to act against surface 82 and post 88, thereby releasing the stored spring energy, and moving device 62 forward, forward wall 66, now in the rear position, will act against stationary rear guide post 78 to stop the forward movement of carrier 64.

The principles of the present invention are applicable not only to 5¼ inch and 3½ inch computer data backup drives, but also to the cleaning of any read/write head containing slots in the tape contact surface. Further, although the slots 34 described above are indicated to be substantially vertical, future read/write heads may incorporate slots in a different orientation. All that is necessary to modify the present invention to accomplish effective cleaning of slots of different orientations is to properly reorient the vertically stationary cleaning elements 12 and 14.

The detailed description outlined above is considered to be illustrative only of the principles of the invention. Numerous changes and modification will occur to those skilled in the art, and there is no intention to restrict the scope of the invention to the detailed description. The preferred embodiment having been described in detail the scope of the invention should be defined by the following claims.

What is claimed is:

1. A cleaning cartridge for cleaning a read/write head of a tape drive, the read/write head vertically reciprocating during a cleaning operation, the cartridge comprising:
   a housing having a front, head receiving side;
   a supply of cleaning tape wound around a spool rotatably attached to the housing for movement along a tape path extending along the front side of the housing, the tape positioned to engage the read/write head during cleaning use;
   a resiliently displaceable cleaning device comprising:
      a carrier moveably attached to the housing and normally biased towards the front side of the housing such that the device is disposed for contact by the read/write head during a cleaning operation, said carrier having a mounting surface;
   an upper cleaning segment and a lower cleaning segment attached to the mounting surface, the upper segment positioned above the cleaning tape and said lower segment positioned below the cleaning tape whereby the read/write head is cleaned by the upper and lower segments of the cleaning device and the cleaning tape.

2. The cleaning cartridge described in claim 1, wherein said cleaning device further comprises a single band of brush-like material having a plurality of fibers defining said upper and lower cleaning segments.

3. The cleaning cartridge described in claim 1, wherein the resiliently displaceable cleaning device is reciprocally moveable along a linear path.

4. The cleaning cartridge described in claim 1 wherein the cleaning device is slidably attached to the housing for movement in a direction coextensive with the direction of motion of the read/write head of the tape drive.

5. The cleaning cartridge described in claim 4 wherein the cleaning device has a predetermined linear range of motion limited by at least one projection on the housing and stopping the motion of the device in at least one direction.

6. The cleaning cartridge described in claim 1 wherein the cleaning device is forwardly biased by a spring operably attached to the housing and positioned such that the spring exerts a force on a surface of the device, thereby urging the device toward the front side of the housing.

7. The cleaning cartridge described in claim 1 wherein the cleaning device has a rear surface spaced from the mounting surface and attached thereto by at least one connecting member, thereby defining the carrier for the cleaning segments.

8. The cleaning cartridge described in claim 7 wherein the carrier is slidably attached to the housing for movement in a direction coextensive with the direction of motion of the read/write head of the tape drive, the movement being limited by contact between the carrier and the projection.

9. The cleaning cartridge described in claim 1 wherein the cleaning device is pivotally attached to the housing such that the mounting surface of the cleaning device has a predetermined arcuate path of motion positioned such that the predetermined linear travel of motion of the read/write head of the tape drive is substantially tangential to the predetermined arcuate path of motion of the mounting surface.

10. A cleaning cartridge as described in claim 1, wherein said mounting surface is convex.

11. A cleaning cartridge as described in claim 1, wherein said mounting surface is concave to receive a convex read/write head in conforming relation.

12. A cleaning cartridge as described in claim 1, wherein the cleaning device is constructed and arranged such that it can be reoriented to assume at least one stationary, non-displaceable orientation.

13. A cleaning cartridge as described in claim 12, wherein the cleaning device comprises at least two mounting surfaces for carrying cleaning segments constructed and arranged to become operable when the cleaning device assumes a respective, predetermined orientation.

14. The cleaning cartridge described in claim 12, wherein said cleaning segments comprise a single band of brush-like material having a plurality of fibers.

15. A cleaning cartridge as described in claim 1, the cleaning device further comprising:

a plurality of mounting surfaces, the mounting surfaces having a variety of surface configurations; and, a plurality of possible operating orientations corresponding to the plurality of mounting surfaces thereby allowing an operator to select a desired mounting surface configuration.

16. A cleaning cartridge as described in claim 1 wherein the mounting surface defines an indentation for alleviating pressure placed on the cleaning tape the read/write head.

17. A cleaning cartridge for cleaning a vertically reciprocating read/write head of a tape drive, the head having a plurality of substantially vertical slots with distinct edges, the slots having upper and lower portions, the cartridge comprising:

a housing;

a supply of cleaning tape wound around a spool rotatably attached to the housing, the tape positioned to engage the read/write head during use;

a resiliently displaceable cleaning device having;

a forward wall providing a mounting surface;

an upper cleaning segment and a lower cleaning segment attached to the mounting surface and disposed so as to contact the read/write head during a cleaning operation, said upper segment positioned above the cleaning tape so as to engage the upper portions of the head slots as the read/write head reciprocates vertically and said lower segment positioned below the cleaning tape so as to engage the lower portions of the head slots as the read/write head reciprocates vertically whereby the read/write head is cleaned by the upper and lower segments of the cleaning device;

opposing side walls integral with the forward wall and extending rearwardly therefrom and defining a slot between the walls for receiving a forward guide post and a rearward guide post affixed to the housing such that the guideposts are received within the slot to guide the device along a linear path, the slot being forwardly defined by the forward wall thereby providing a rearward limit to the range of linear sliding motion of the device when the forward wall contacts the forward guidepost;

a rear wall integral with the side walls to rearwardly define the slot thereby providing a forward limit to the range of linear sliding motion of the device when the rear wall contacts the rearward guidepost;

a surface for exertion thereupon by a spring attached to the housing and biased so as to exert a forwardly directed force upon the surface thereby maintaining the device in a forward position when the device is not acted rearwardly upon the read/write head.

18. A cleaning cartridge as described in claim 17, wherein said mounting surface is concave to receive a convex read/write head in conforming relation thereto.

19. A cleaning cartridge as described in claim 17, wherein said mounting surface is convex.

20. A cleaning cartridge as described in claim 17, wherein said mounting surface is flat.

21. A cleaning cartridge as described in claim 17 wherein the mounting surface defines an indentation for alleviating pressure placed on the cleaning tape by the read/write head.

* * * * *